(12) United States Patent
Shin (10) Patent No.: US 8,359,149 B2
(45) Date of Patent: Jan. 22, 2013

(54) METHOD FOR INTEGRATING MULTIPLE FEATURE ADAPTIVE CRUISE CONTROL

(75) Inventor: Kwang-Keun Shin, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 354 days.

(21) Appl. No.: 12/690,317

(22) Filed: Jan. 20, 2010

(65) Prior Publication Data

US 2010/0198450 A1    Aug. 5, 2010

Related U.S. Application Data

(60) Provisional application No. 61/149,395, filed on Feb. 3, 2009.

(51) Int. Cl.
*B60W 30/16*    (2006.01)

(52) U.S. Cl. .............................. 701/93; 701/96

(58) Field of Classification Search ............. 701/93, 701/96
See application file for complete search history.

(56) References Cited

U.S. PATENT DOCUMENTS

| | | | | |
|---|---|---|---|---|
| 3,952,301 A * | 4/1976 | Sorkin | ............... | 342/71 |
| 5,485,161 A * | 1/1996 | Vaughn | ............... | 342/357.31 |
| 5,969,640 A * | 10/1999 | Timm et al. | ............... | 340/903 |
| 6,411,883 B1 * | 6/2002 | Basten | ............... | 701/93 |
| 6,738,705 B2 * | 5/2004 | Kojima et al. | ............... | 701/96 |
| 6,836,719 B2 * | 12/2004 | Andersson et al. | ............... | 701/93 |
| 6,970,779 B2 * | 11/2005 | Kagawa et al. | ............... | 701/93 |
| 7,200,480 B2 * | 4/2007 | Kustosch | ............... | 701/93 |
| 7,296,646 B2 * | 11/2007 | Kawazoe et al. | ............... | 180/179 |
| 7,400,963 B2 * | 7/2008 | Lee et al. | ............... | 701/93 |
| 7,433,772 B2 * | 10/2008 | Isaji et al. | ............... | 701/71 |
| 7,627,413 B2 * | 12/2009 | Kawazoe et al. | ............... | 701/93 |
| 7,653,472 B2 * | 1/2010 | Kawazoe et al. | ............... | 701/93 |
| 7,831,366 B2 * | 11/2010 | Imai et al. | ............... | 701/70 |
| 8,041,493 B2 * | 10/2011 | Seto et al. | ............... | 701/93 |
| 2004/0122576 A1 * | 6/2004 | Sorrells | ............... | 701/50 |
| 2005/0131614 A1 * | 6/2005 | Isogai et al. | ............... | 701/93 |
| 2006/0224294 A1 * | 10/2006 | Kawazoe et al. | ............... | 701/93 |
| 2007/0282513 A1 * | 12/2007 | Michi et al. | ............... | 701/96 |
| 2008/0078600 A1 * | 4/2008 | Inoue et al. | ............... | 180/170 |
| 2008/0243349 A1 * | 10/2008 | Trautenberg | ............... | 701/93 |
| 2009/0037070 A1 * | 2/2009 | Nakamura | ............... | 701/96 |
| 2010/0161195 A1 * | 6/2010 | Shin | ............... | 701/93 |

* cited by examiner

*Primary Examiner* — Thomas Black
*Assistant Examiner* — Marthe Marc-Coleman (57) ABSTRACT

The velocity of a vehicle is controlled according a cruise control system that has a plurality of cruise control features. Each of the cruise control features has a current desired velocity requirement which can be used to determine a single current desired velocity for controlling the vehicle. A future desired velocity requirement can be predicted for each of the cruise control features over a time period. Vehicle acceleration can be determined from the difference of the current desired velocity and the predicted future velocity for controlling the velocity and acceleration of the vehicle to the predicted future velocity.

17 Claims, 6 Drawing Sheets

METHOD FOR INTEGRATING MULTIPLE FEATURE ADAPTIVE CRUISE CONTROL

CROSS REFERENCE TO RELATED APPLICATIONS

This application claims the benefit of U.S. Provisional Application No. 61/149,395 filed on Feb. 3, 2009 which is hereby incorporated herein by reference.

TECHNICAL FIELD

This disclosure is related to automatic speed control in a motor vehicle.

BACKGROUND

The statements in this section merely provide background information related to the present disclosure and may not constitute prior art.

Methods of automatic speed control are becoming more complex as features and capabilities are being added to vehicles and desired by customers. The most basic automatic speed control is conventional cruise control (CCC), which allows an operator to set a reference velocity and controls powertrain output to the reference velocity. Examples of more advanced versions becoming more popular are adaptive cruise control, speed limit following, and curve speed control.

Adaptive cruise control (ACC) is a control method for automatically controlling a vehicle within a lane of traffic, maintaining a desired velocity while maintaining a safe distance, or headway, from other vehicles in the same lane of travel. The essential function of ACC is target vehicle following which means that a host vehicle follows a target vehicle while maintaining a certain separation (e.g. time or distance) while attempting to maintain the desired velocity. The host vehicle is the vehicle being controlled by ACC, and the target vehicle is the vehicle in front of the host vehicle.

Speed limit following (SLF) is a method of vehicular velocity control, wherein a vehicle subsystem monitors a current speed limit for a road currently being traveled upon and the speed limit for the road at a distance in front of the vehicle. The vehicle velocity is maintained in relation to the monitored speed limit(s). At steady state, the vehicle is operated similarly to a vehicle with CCC, with the reference velocity for the vehicle set to the speed limit. In transitions, one exemplary method is reacting to pending changes in speed limits which includes reducing reference velocity before the approach of a lower speed limit zone and raising the reference velocity after a higher speed limit zone is entered. In this preferred method, the speed limit is never violated. Vehicular velocity is maintained at or below the speed limit, including transitional increases and decreases in vehicle velocity. Speed limits for the road currently being traveled upon and for the road in front of the vehicle can be determined in a number of ways. One preferred method includes coordinated use of a global positioning device (GPS) and a digital map database, including speed limit data for an identified stretch of road and data describing points of speed limit change on a road.

Curve speed control (CSC) is a method of vehicular velocity control wherein a vehicle subsystem monitors a current road curvature and a road curvature some distance ahead. Safe velocities on a straight road being traveled upon and safe velocity on a similar but curved road can be different. Force on a vehicle caused by angular acceleration through a curve is a destabilizing factor on the vehicle not present on a straight stretch of road. Force on the vehicle caused by angular acceleration through a given curve can be reduced by decreasing vehicle velocity. Curve speed control monitors the curvature of the road currently being traveled upon and the curvature of road in front of the vehicle while vehicle velocity is reduced based upon predicted effects of angular acceleration upon the vehicle. Speed limit data for a particular road and curvature data for a stretch of road can be determined in a number of ways. For example, a GPS device and a digital map database can be utilized to look-up or determine both speed limits and road curvature. Additionally or alternatively, a camera or visual imaging device can be utilized in combination with image recognition programming to estimate road curvature for the road being traveled upon.

The above described speed control devices can act together to control the vehicle through a single vehicle speed control system, for example, a throttle control and a brake control. Such a combination of speed control methods can be accomplished, for example, in a multiple feature cruise control, monitoring as inputs velocity and/or acceleration commands from modules performing one of the aforementioned speed control methods and prioritizing a single set of commands to the vehicle speed control system.

Travel in a lane of traffic is inherently a variable and complicated situation. A method to smoothly control velocity of a vehicle based upon an integration of conventional cruise control, adaptive cruise control, speed limit following control, and curve speed control would be beneficial to the operation of the vehicle and occupant comfort.

SUMMARY

The velocity of a vehicle is controlled according a cruise control system that has a plurality of cruise control features. Each of the cruise control features has a current desired velocity requirement which can be used to determine a single current desired velocity for controlling the vehicle. A future desired velocity requirement can be predicted for each of the cruise control features over a time period. Vehicle acceleration can be determined from the difference of the current desired velocity and the predicted future velocity for controlling the velocity and acceleration of the vehicle to the predicted future velocity.

BRIEF DESCRIPTION OF THE DRAWINGS

One or more embodiments will now be described, by way of example, with reference to the accompanying drawings, in which.

DETAILED DESCRIPTION

Figure 1:
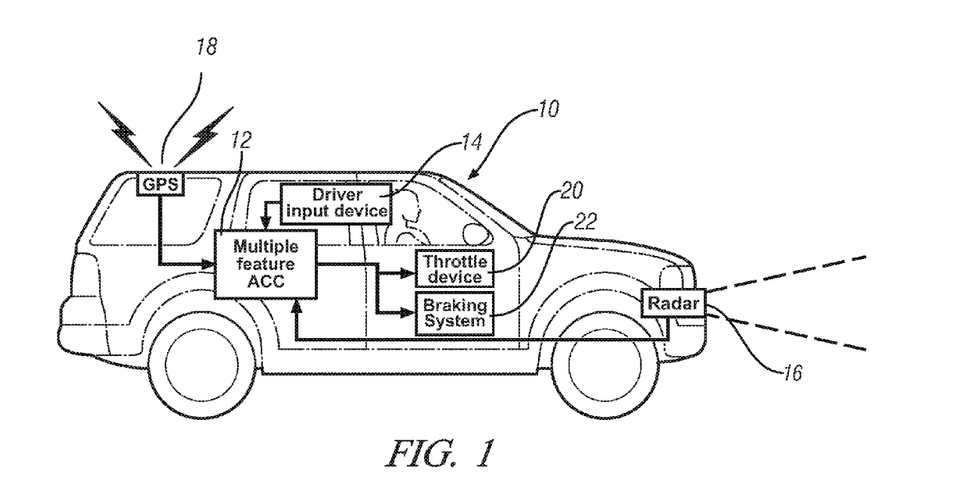
FIG. 1 schematically illustrates an exemplary vehicle equipped with a multiple feature cruise control, in accordance with the present disclosure.

Referring now to the drawings, wherein the showings are for the purpose of illustrating certain exemplary embodiments only and not for the purpose of limiting the same, FIG. 1 schematically illustrates an exemplary vehicle, generally at 10, equipped with a multiple feature cruise control 12. A multiple feature cruise control system 12 can be utilized to monitor inputs from various sources, prioritize control of vehicle velocity based upon the various inputs, and output velocity and acceleration control commands to a vehicle speed control system. It will be appreciated that the exemplary vehicle 10 includes one possible set of systems and devices, but a number of potential configurations and different systems and devices are envisioned, and the disclosure is not intended to be limited to the particular exemplary embodiments described herein.

Multiple feature cruise control 12 is an autonomous and convenience feature that extends conventional cruise control (CCC) 40 by integrating features such as adaptive cruise control (ACC) 60, speed-limit following (SLF) 80, and curve speed control (CSC) 100. Multiple feature cruise control 12 accepts inputs from a driver input device 14, a forward looking sensor device 16 such as a radar monitoring system, and a global positioning system (GPS) location device 18 to create acceleration outputs for controlling the forward velocity of the vehicle 10. The acceleration outputs, in one embodiment, include commands for a throttle device 20 and braking system 22 based on the acceleration being positive or negative respectively. Throttle device 20 is depicted for simplicity as a system controlling an output of the powertrain, however, it will be appreciated that a number of engine or powertrain control devices or modules are contemplated, and the disclosure is not intended to be limited by a narrow definition of throttling device. Similarly, braking system 22 is depicted for simplicity as a system controlling deceleration or negative acceleration of the vehicle, however, it will be appreciated that a number of devices or methods such as engine braking or regenerative braking in hybrid powertrain are contemplated, and the disclosure is not intended to be limited by a narrow definition of braking device. In other exemplary embodiments, depending upon the particular cruise control functions being served, control only by throttle commands can be achieved. In other exemplary embodiments, for instance in relation to a hybrid drive powertrain or powertrain including electrical motors, the electrical motors can be used instead of or in cooperation with the engine to make adjustments to vehicle speed.

Figure 2:
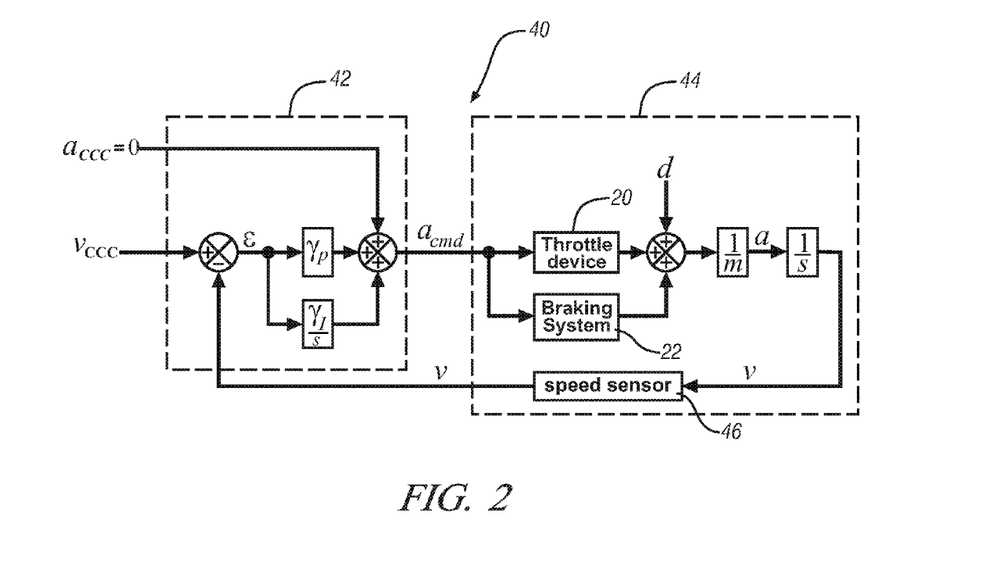
FIG. 2 schematically illustrates operation of an exemplary conventional cruise control system, in accordance with the present disclosure.

FIG. 2 schematically illustrates operation of an exemplary CCC system shown generally at 40. CCC control feature 40 functions to maintain vehicle velocity at a driver-selected reference or set velocity, $v_{CCC}$. The driver-selected reference velocity, $v_{CCC}$, is input, for example, by a human interface device. The actual vehicle velocity, v, is monitored and supplied to a speed controller 42 by a speed sensor 46. The speed controller 42 calculates necessary acceleration command $a_{cmd}$ to match the driver selected set velocity $v_{SET}$ if the vehicle velocity v differs. In one exemplary configuration, if the acceleration command $a_{cmd}$ is positive, throttle device 20 is applied, and if the acceleration command is negative, braking system 22 is applied.

The set velocity, $v_{CCC}$, is, for example, selected by a driver and is monitored by the speed controller 42. An acceleration input, $a_{CCC}$, is monitored by the speed controller 42. The resulting vehicle velocity v is monitored from speed sensor 46 as a feedback input. The speed controller 42 compares vehicle velocity v with that of set velocity $v_{CCC}$ to determine the acceleration command $a_{cmd}$. $a_{cmd}$ is output to a vehicle speed control system 44 to command the throttle device 20 and braking system 22 to respectively increase and decrease vehicle velocity. In this way, the speed controller 42 can track and control vehicle velocity v to match the set velocity $v_{CCC}$.

Figure 3:
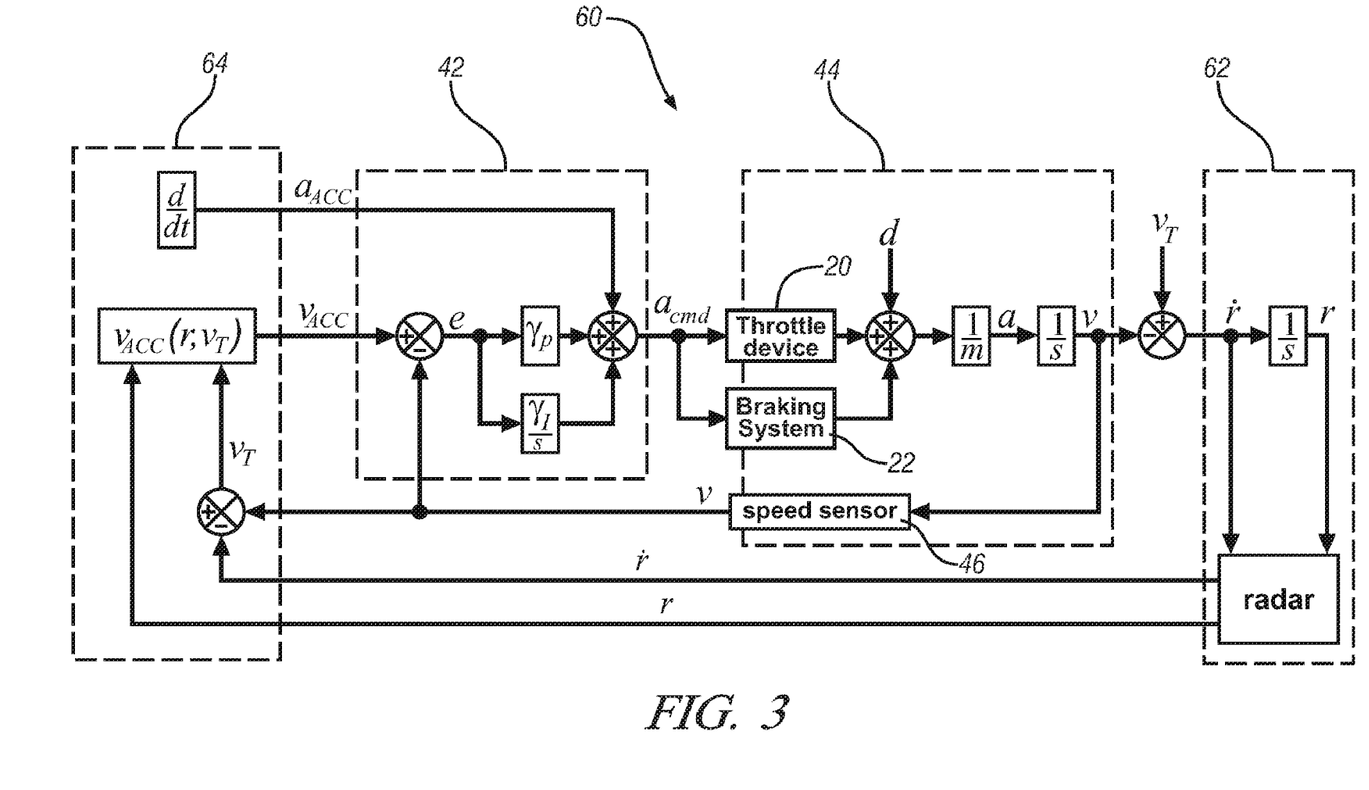
FIG. 3 schematically illustrates operation of an exemplary adaptive cruise control system, in accordance with the present disclosure.

FIG. 3 schematically illustrates operation of an exemplary ACC feature shown generally at 60. A multiple feature cruise control system 12 equipped with ACC control feature 60 feature maintains vehicle headway, which may be driver selectable, if a preceding vehicle is detected by forward looking sensors 62, e.g., radar, LIDAR, visual, or sonar systems. In other embodiments, a communicative device can be utilized to communicate with other vehicles in traffic in order to set speeds and ranges among the vehicles and/or warn of oncoming conditions in traffic, e.g., radio or satellite communication. The preceding vehicles or target vehicles are tracked in relation to the vehicle based upon the input from the forward looking sensor or other device generating information about the target vehicles.

The forward looking sensor 62 provides a range, r, and change of range or range rate, ṙ, for determining vehicle headway. An ACC command generation block 64 monitors vehicle inputs such as vehicle velocity v, range r, and range rate ṙ to compare against the headway. The ACC command generation block 64 generates desired velocity $v_{ACC}$ and desired acceleration $a_{ACC}$ and outputs the data for the speed controller 42. The speed controller 42 determines necessary acceleration command $a_{cmd}$ as an output which is input to the vehicle speed control system 44 to control an exemplary vehicle including the throttle device 20 and braking system 22. If the acceleration command $a_{cmd}$ is positive, throttle device 20 is applied, and if the acceleration command $a_{cmd}$ is negative, braking system 22 is applied. As vehicle velocity v is increased and decreased, vehicle headway can be maintained.

Figure 4:
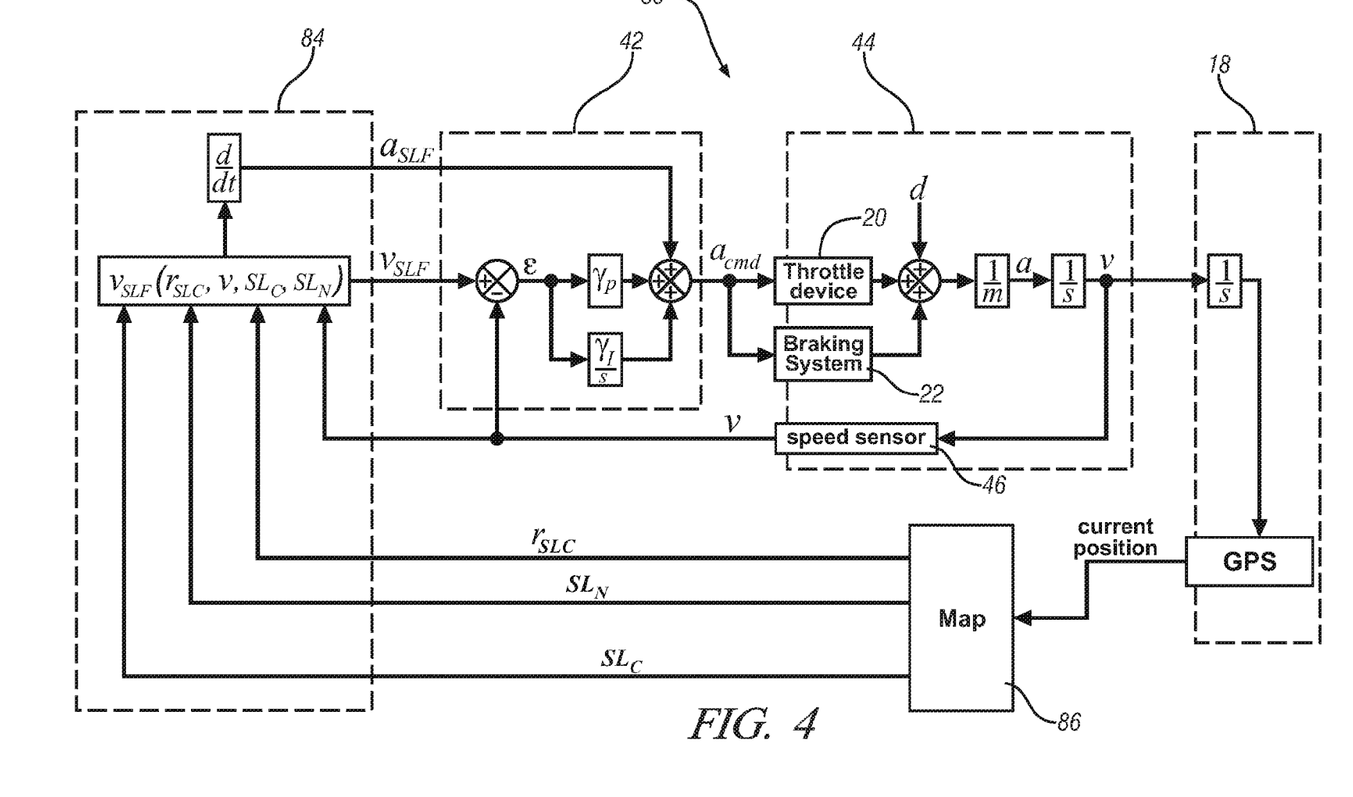
FIG. 4 schematically illustrates operation of an exemplary speed limit following control system, in accordance with the present disclosure.

FIG. 4 schematically illustrates operation of an exemplary SLF control feature shown generally at 80. SLF control feature 80 automatically changes the set velocity $v_{SLF}$ in response to detected changes in speed limit zones. In one exemplary embodiment, the multiple feature cruise control system 12 equipped with SLF control feature 80 reduces vehicle velocity v before entering a lower speed-limit zone and accelerates after entering a higher speed-limit zone. A system or device is utilized to generate information describing a speed limit of a current roadway and may include information about a speed limit of a roadway in front of the vehicle. In an exemplary system, a GPS 18 detects and outputs a current location for the vehicle 10. A map database 86 provides the speed limit of the current location $SL_c$, location of next speed limit changing point $SL_N$, and distance to the speed limit changing point $r_{SLC}$. By coordinating current location and speed limit data, a dynamic set velocity $v_{SLF}$ can be utilized to automatically control the vehicle velocity to a prescribed limit. In another exemplary embodiment, a vision system coupled with known pattern recognition methods can be utilized to determine posted speed limits upon a roadway. Such determined speed limits can be used similarly to speed limits discernable by GPS enabled methods.

Vehicle positioning is determined by the GPS 18 and is output for comparison with a map database 86. The map database 86 outputs current speed limit $SL_C$, next speed limit $SL_N$, and distance to the speed limit change $r_{SLC}$ for input to the SLF command generation block 84. The command generation block 84 also receives vehicle speed v input from the speed sensor 46. The command generation block 84 can then output a desired vehicle velocity $v_{SLF}$ and desired acceleration $a_{SLF}$. The speed controller 42 compares the inputs of desired vehicle velocity $v_{SLF}$ and desired acceleration $a_{SLF}$ to the current vehicle velocity v and calculates necessary acceleration command $a_{cmd}$ The necessary acceleration command $a_{cmd}$ outputs to the vehicle speed control system 44. In one exemplary embodiment, if the acceleration command $a_{cmd}$ is positive, throttle device 20 is applied, and if the acceleration command $a_{cmd}$ is negative, braking system 22 is applied.

In an example operation, the SLF command generation block compares current vehicle velocity v with that of the current speed limit $SL_C$ to generate and send out desired vehicle velocity $v_{SLF}$ and desired acceleration $a_{SLF}$ to the speed controller 42 such that the current speed limit $SL_C$ is met and maintained. The SLF command generation block 84 also compares current speed limit $SL_C$ with the next speed limit $SL_N$ to determine if an increase or decrease to the speed limit may occur. If a decrease from the current speed limit $SL_C$ is approaching, the SLF command generation block 84 outputs desired acceleration and velocity, $a_{SLF}$ and $v_{SLF}$, respectively, requests to decrease vehicle velocity v to the speed controller 42. The speed controller 42 compares the acceleration and velocity requests $a_{SLF}$ and $v_{SLF}$ to the vehicle velocity v and sends an acceleration command $a_{cmd}$ to the braking system 22. The vehicle velocity v therefore is reduced to the next speed limit $SL_N$ in anticipation of the required decrease in speed limit preventing a violation. If there is an impending increase in the next speed limit $SL_N$, the SLF command generation block 84 will send desired acceleration and velocity commands, $a_{SLF}$ and $v_{SLF}$ to the speed controller 42 requesting an increase in vehicle velocity v upon the vehicle 10 reaching the next speed limit $SL_N$ change point. The SLF command generation block 84 follows the above descriptions to prevent violating the lower speed limit in each case.

Figure 5:
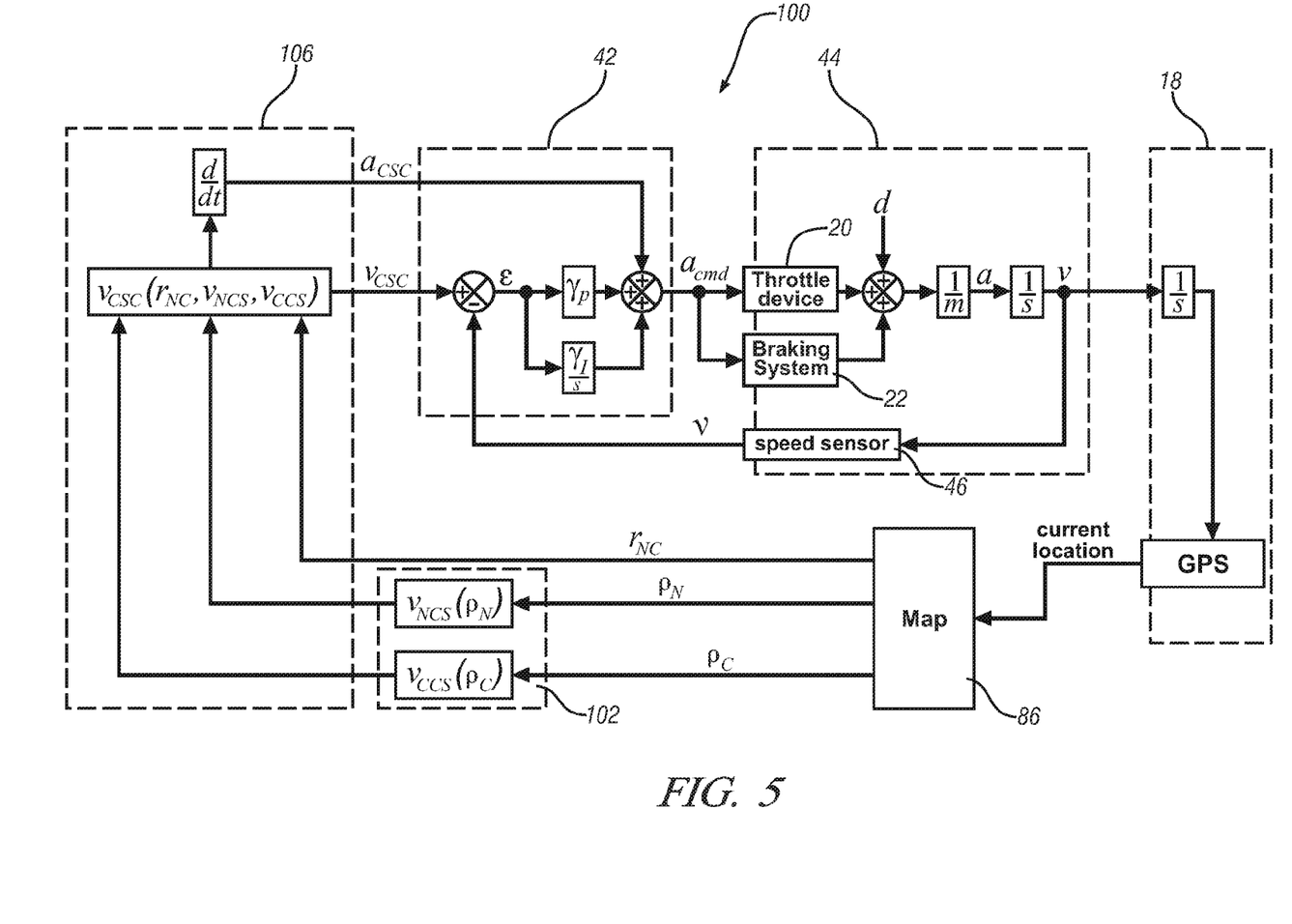
FIG. 5 schematically illustrates operation of an exemplary curve speed control system, in accordance with the present disclosure.

FIG. 5 schematically illustrates operation of an exemplary CSC feature generally shown at 100. CSC 100 feature reduces vehicle velocity v accordingly before, at, or entering a curve if vehicle velocity v is faster than a predetermined turning velocity. In one exemplary embodiment, the multiple feature cruise control system 12 is equipped with CSC 100 feature to reduce vehicle velocity before reaching a curvature of the road and accelerate upon leaving the curvature. A system or device is utilized to generate information describing a curvature and a suggested speed of a current roadway and may include information about a curvature and a selected speed of a roadway in front of the vehicle. In an exemplary system, a GPS 18 detects and outputs a current location for the vehicle 10. A map database 86 provides curvature data for current curvature, $\rho_C$, next curvature, $\rho_N$, and distance from current vehicle position to the next curvature, $r_{NC}$. A series of look-up tables 102 provide velocity requirements for a given road curvature. In another exemplary embodiment, vehicle position described by GPS device in coordination with digital map data can be utilized to determine posted recommended maximum speed for a particular curved section of roadway. By coordinating current location and curvature data, a dynamic set velocity $v_{CSC}$ can be utilized to automatically control the vehicle velocity v to a prescribed limit.

The GPS 18 detects and outputs current location of the vehicle 10. The current location is compared to the map database 86 which provides the current curvature for the location $\rho_C$, the next curvature $\rho_N$, and distance to the next curvature $r_{NC}$. The current curvature $\rho_C$ and the next curvature $\rho_N$, variables are converted into curve speeds, $v_{CCS}(\rho_C)$ and $v_{NCS}(\rho_N)$ respectively, by look-up tables 102. The CSC command generation block 106 inputs vehicle velocity v, distance to the next curvature change $r_{NC}$, next curve speed $v_{NCS}(\rho_N)$, and current curve speed $v_{CCS}(\rho_C)$ and outputs desired velocity $v_{CSC}$ and desired acceleration $a_{CSC}$ to the speed controller 42. The speed controller 42 also inputs vehicle velocity v to calculate and output necessary acceleration command $a_{cmd}$ to the vehicle speed control system 44. In one exemplary embodiment, if the acceleration command $a_{cmd}$ is positive, throttle device 20 is applied, and if the acceleration command is negative, braking system 22 is applied.

In an example operation, if the vehicle 10 is traveling on a road without curvature and approaches road curvature, next curvature $\rho_N$ and distance to the next curvature $r_{NC}$ is determined from the GPS 18 output relative to the map database 86 and the look-up table 102 provides next curve velocity $v_{NCS}(\rho_N)$. Before the road begins to curve, distance to the next curve $r_{NC}$ becomes reduced, the CSC command block 106 compares vehicle velocity v to next curve velocity $v_{NCS}(\rho_N)$ and outputs reduced desired acceleration $a_{CSC}$ and velocity $v_{CSC}$ commands to the speed controller 42, if necessary. The speed controller 42 compares the desired velocity $v_{CSC}$ with the vehicle velocity v and produces an appropriate negative acceleration command $a_{cmd}$ thereby applying the braking system 22 until vehicle velocity $v_{NCS}(\rho_N)$ is achieved for the next curve $r_{NC}$. As the road begins to curve, the next curvature $\rho_N$ becomes current curvature $\rho_C$ and iteratively continues the process. As the road curvature straightens, the next curve, including a higher $\rho_N$, has less velocity limitation and the acceleration command $a_{cmd}$ may become positive thereby applying throttle device 20 to the vehicle 10 and resuming vehicle velocity 10 prior to entering the curve, if a reduction of vehicle velocity 10 was required previously.

The above methods describe a number of cruise control methods or functions, each selecting a desired or maximum tolerable velocity for each function. It will be appreciated that the different functions can describe different desired speeds. For example, a vehicle exiting a tight turn onto a straight segment of road can include a relatively high $v_{NCS}$ value anticipating travel upon the straight road; however, the impending presence of a school speed zone with a lower speed limit, as determined in a low $v_{SLF}$ value, can conflict with the higher $v_{NCS}$ value. Each method can return a different current desired velocity requirement, $v_{xxx}$, and a different current desired acceleration requirement, $a_{xxx}$. From each of these desired or maximum tolerable velocities $v_{xxx}$ and desired or maximum tolerable accelerations $a_{xxx}$, a future desired or maximum tolerable velocity, $v_{future/xxx}$ can be predicted. A method is disclosed to monitor a plurality of future desired velocities $v_{future/xxx}$ from each of a plurality of cruise control functions and select a desired velocity $v_{des}$ and a desired acceleration $a_{des}$ based upon a minimum of the future desired velocities $v_{future/xxx}$.

Figure 6:
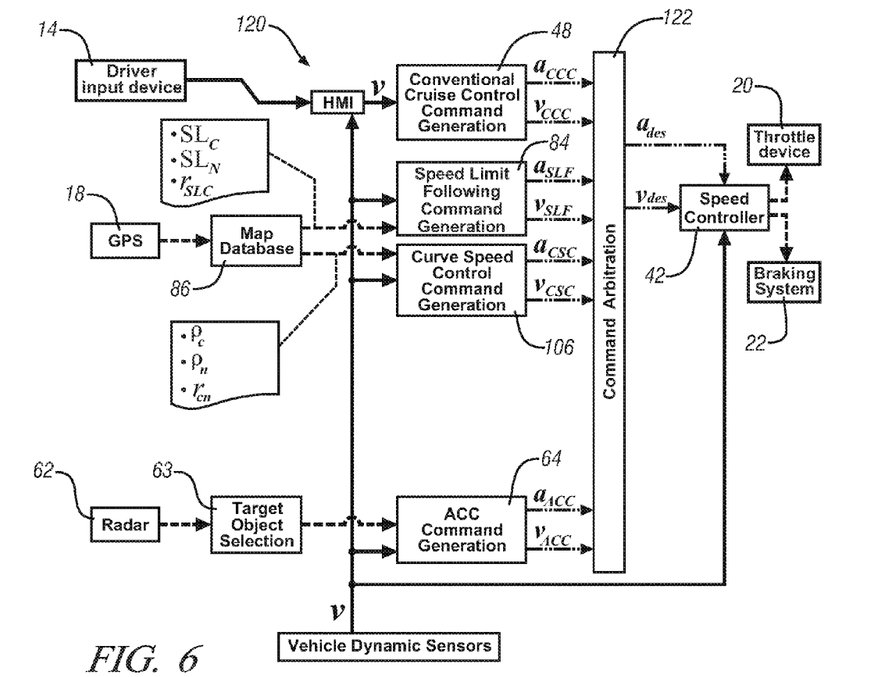
FIG. 6 schematically illustrates an exemplary control system, including a command arbitration function, monitoring various inputs and creating a single velocity output and a single acceleration output for use by a single vehicle speed controller, in accordance with the present disclosure.

FIG. 6 schematically illustrates an exemplary control system, generally shown at 120, which includes a command arbitration function 122 to monitor various acceleration and velocity inputs, $a_{xxx}$ and $v_{xxx}$ signifying generally the various acceleration and velocity inputs of the different cruise control functions, respectively, and create outputs including a current desired velocity $v_{des}$ and a current desired acceleration $a_{des}$ for use by a single vehicle speed controller 42. A number of exemplary input sources are monitored, describing operation of the vehicle and conditions of the roadway proximate to the vehicle, and can be processed according to the exemplary methods described above to describe $a_{xxx}$ and $v_{xxx}$ for each function. The exemplary input sources depicted include driver input device 14, GPS system 18 in combination with map database 86, radar system 62 in combination with target object selection module 63, and vehicle dynamic sensors 15 describing current operation of the vehicle. The various features of a multiple feature cruise control 12, including modules described by a CCC command generation block 48, ACC command generation block 64, SLF command generation block 84, and CSC command generation block 106, monitor the various inputs and output $a_{xxx}$ and $v_{xxx}$ for each function. These $a_{xxx}$ and $v_{xxx}$ outputs are controlled utilizing the command arbitration function 122 to select desired velocity, $v_{des}$, and desired acceleration, $a_{des}$, terms to control the vehicle 10 including, in this exemplary embodiment, providing commands to throttle device 20 and braking system 22. In this way, inputs describing operation of the vehicle can be utilized, through a plurality of cruise control features, to control operation of a vehicle.

Each of the features operate as described above, and outputs from these features are monitored and prioritized in the command arbitration block 122. Various features can target different velocities and different accelerations but the limits of each feature must be obeyed. For instance, the ACC feature 60 may request an acceleration due to an increasing range r to the target vehicle in front of the host vehicle 10, but the SLF 80 feature may restrict such an acceleration due to the vehicle velocity v approaching the speed limit. Even where no current limit prohibits fulfilling an acceleration or velocity request $a_{xxx}$, $v_{xxx}$ from one of the features, an upcoming change in conditions can make pending requests adverse to maintaining drivability. A method to achieve command arbitration between various outputs of the multiple feature cruise control system 12 can include predicting future desired velocities for each feature ($v_{future/xxx}$), limited by a maximum tolerable velocity predicted by the feature, at some future time, e.g., at a time horizon, T, and comparing these predicted velocities. The comparison allows the multiple feature cruise control system 12 to select from the desired velocities $v_{xxx}$ a minimum desired velocity of the cruise control functions as the current desired velocity, $v_{des}$. Selecting the minimum of $v_{xxx}$ values ensures that $v_{des}$ will not exceed any of the cruise control feature maximum velocities. Additionally, the comparison allows the multiple feature cruise control system 12 to select a current desired acceleration $a_{des}$ based upon future desired velocities $v_{future/xxx}$ of the various cruise control features at the time horizon T and the current desired velocity $v_{des}$. By utilizing future desired velocities $v_{future/xxx}$ of the various cruise control features at the time horizon T, the method can predictively control acceleration of the vehicle to avoid violating the future desired velocities $v_{future/xxx}$. By monitoring current requirements of the plurality of cruise control features and predicting future requirements of the plurality of cruise control features, a current desired velocity and a current desired acceleration to control the vehicle can be determined and utilized.

Figure 7:
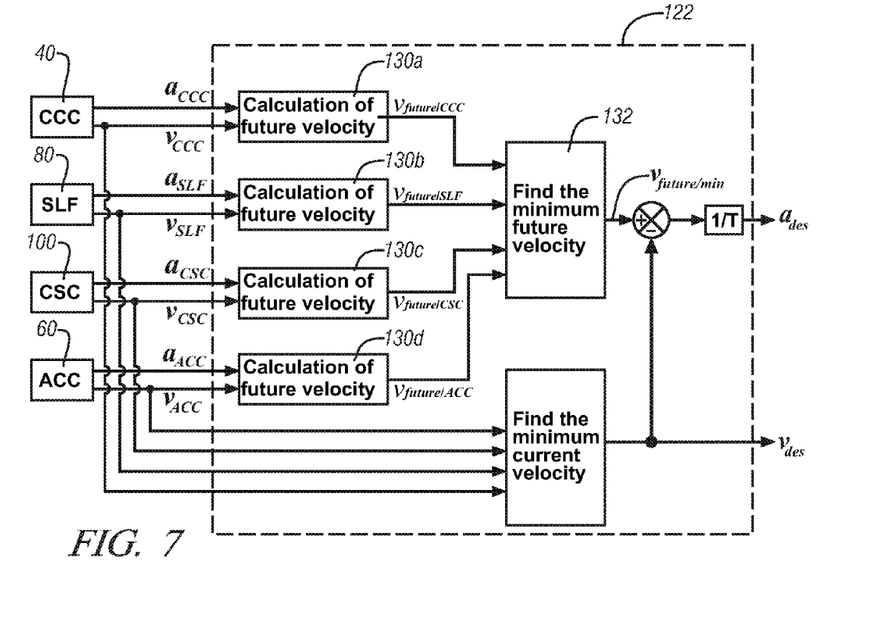
FIG. 7 illustrates an exemplary data flow predicting future velocities required by various speed control features and utilizing a command arbitration function to select an acceleration based upon the arbitration, in accordance with the present disclosure.

FIG. 7 illustrates an exemplary data flow predicting future velocities $v_{future/xxx}$ required by the various cruise control features and utilizing a command arbitration 122 function to select an acceleration $a_{des}$ and velocity $v_{des}$. CCC control feature 40, ACC control feature 60, SLF control feature 80, and CSC control feature 100 are depicted, including desired velocity and acceleration, $v_{xxx}$ and $a_{xxx}$, outputs for each, expressing a current maximum or limiting velocity and acceleration that each feature can tolerate. Each feature output is input to a respective future velocity calculation block 130a, 130b, 130c, and 130d to predict a future velocity $v_{future/xxx}$ at a future time, for example, based on the time horizon T and discussed in further detail below. The current velocities $v_{xxx}$ can be used to determined $v_{des}$, as described above. The future velocities $v_{future/xxx}$ are compared in a minimum future velocity block 132 to determine the minimum future velocity $v_{future/min}$ for the given set of features. The minimum future velocity $v_{future/min}$ and current desired velocity $v_{des}$ are used to calculate current desired acceleration, $a_{des}$, and each is output to the speed controller 42 for controlling the vehicle 10. The above calculation of $a_{des}$ assumes operation of the vehicle at $v_{des}$. It will be appreciated that the data flow can be corrected to include the current velocity of the vehicle, v, as necessary according to methods known in the art.

Figure 8:
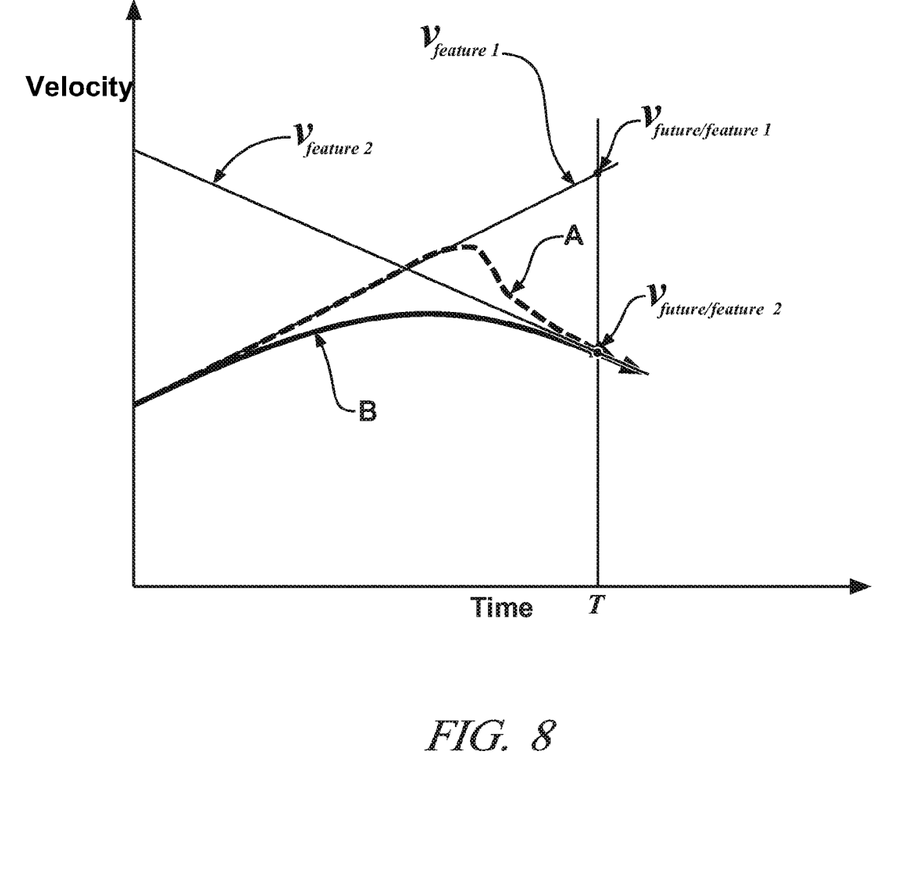
FIG. 8 graphically illustrates exemplary reaction times of a vehicle to changes in desired velocities of various multiple feature cruise control features, including an exemplary prediction of desired future velocity, in accordance with the present disclosure.

FIG. 8 graphically illustrates control of an exemplary vehicle 10 exhibiting reaction times to changes in desired velocities of various multiple feature cruise control features, including an exemplary resulting velocity v. A $v_{future/feature1}$ and a $v_{future/feature2}$ are depicted describing desired future velocities $v_{future/xxx}$ for a first and second cruise control feature. Additionally, resulting velocity v is depicted in two exemplary control schemes. Plot A describes resulting velocity v for a multiple feature cruise control system wherein no command arbitration or prediction of desired future velocities for the various features as described by the exemplary methods herein is performed. It will be appreciated that, absent command arbitration, $v_{future/feature1}$ and a $v_{future/feature2}$ additionally describe velocity commands that are actually generated through the depicted time period, $v_{feature1}$ and $v_{feature2}$, respectively. The control system controls vehicle velocity v according to the lower velocity command, feature 1 velocity request, $v_{feature1}$, until a velocity request from feature 2, $v_{feature2}$, becomes less than the velocity request of feature 1 $v_{feature1}$. The control system then experiences a reaction time delay, in terms of sensor reaction time, computational reaction time, and powertrain and brake reaction times to the changing input. Vehicle velocity v is then changed in order to quickly match the new velocity limit placed by feature 2, $v_{feature2}$, but not until after a feature velocity violation has occurred. As will be appreciated by one having ordinary skill in the art, reaction time in a vehicle 10 to an abrupt change in inputs necessarily involves a perceptible transition.

Alternatively and corresponding to the present invention, plot B describes resulting velocity v for a multiple feature cruise control system 12 wherein exemplary command arbitration 122 of the various features is performed. Prediction of future velocities for each feature $v_{future/feature1}$, $v_{future/feature2}$ is determined in a respective future velocity calculation block 130 for a time horizon T, as described in FIG. 7. The future velocities $v_{future/feature1}$, $v_{future/feature2}$ are output to a minimum future velocity block 132 for determining which feature has the minimum current desired velocity $v_{xxx}$ and outputs this as the current desired velocity $v_{des}$ for output to speed controller 42. Similarly, as described above, current desired acceleration $a_{des}$ is determined according to inputs and resulting predictions through time horizon T by the various cruise control functions, for example, as described above in FIGS. 6 and 7. Because $v_{des}$ and $a_{des}$ track outputs of the various cruise control functions and include prediction of the lowest future desired velocities $v_{future/xxx}$ through T, the resulting velocity v can be controlled as depicted by plot B to avoid violating the minimum of the future desired velocities $v_{future/xxx}$. In this way, the disclosed methods can control the vehicle to maintain a current velocity of the vehicle below a minimum of the current desired velocity requirements of the cruise control features and a future velocity of the vehicle below a minimum of the predicted future velocity requirements of the cruise control features.

Command arbitration 122 can be further explained by reviewing the associated equations. The current desired or maximum tolerable acceleration and velocity from the different cruise control features, $a_{xxx}$ and $v_{xxx}$ respectively, are utilized to calculate future desired velocities $v_{future/xxx}$ for each feature. For example, a feature generates two commands $a_{xxx}$ and $v_{xxx}$, as described above. A future desired velocity $v_{future/xxx}$ can be determined from $a_{xxx}$ and $v_{xxx}$, at some future time, for example, through example time horizon T. An exemplary future desired velocity $v_{future/xxx}$, assuming linear behavior through T, is calculated as follows:

$$v_{future/xxx} = v_{xxx} + a_{xxx}T \qquad [1]$$

It will be appreciated that similar equations for future desired velocity $v_{future/xxx}$ based upon non-linear behavior through T can similarly be determined according to methods known in the art. Since the future desired velocity $v_{future/xxx}$ is taken from each of the features in a multiple feature cruise control system 12, command arbitration 122 may be achieved by maintaining v at or below the minimum $v_{xxx}$ and $v_{future/xxx}$ through the time horizon T.

An exemplary command arbitration process can be illustrated when utilizing the time horizon parameter T and the velocities and accelerations of the exemplary functions defined above as inputs of $v_{CCC}$, $v_{SLF}$, $v_{CSC}$, $v_{ACC}$, $a_{CCC}$, $a_{SLF}$, $a_{CSC}$, $a_{ACC}$, is as follows:

Calculate future desired velocity for each feature:

$$v_{future/CCC} = v_{CCC} + a_{CCC}T \qquad [2]$$

$$v_{future/SLF} = v_{SLF} + a_{SLF}T \qquad [3]$$

$$v_{future/CSC} = v_{CSC} + a_{CSC}T \qquad [4]$$

$$v_{future/ACC} = v_{ACC} + a_{ACC}T \qquad [5]$$

Find the minimum future velocity $v_{future/min}$:

$$v_{future/min} = \min(v_{future/CCC}, v_{future/SLF}, v_{future/CSC}, v_{future/ACC}) \qquad [6]$$

Find a minimum current desired velocity:

$$v_{current/min} = \min(v_{CCC}, v_{SLF}, v_{CSC}, v_{ACC}) \qquad [7]$$

Calculate reference velocity and reference acceleration to determine outputs $v_{des}$, $a_{des}$ respectively:

$$v_{des} = v_{current/min} \qquad [8]$$

$$a_{des} = (v_{future/min} - v_{current/min})/T \qquad [9]$$

The exemplary ACC system is depicted above with a conventional cruise control (CCC) feature, adaptive cruise control (ACC) feature, speed limit following (SLF) feature, and curve speed control (CSC) feature. However, it will be appreciated by one of ordinary skill in the art that the methods described herein can be utilized with any sub-combination of these features, for example, a system with only CCC and CSC features. As it will also be appreciated that other features controlling velocity to other factors, including weather, pedestrian or object impact mitigation, traffic, identified road hazards, emission control in identified pollution control zones, control methods selecting the fastest travel time possible, hybrid drive control strategies, e.g., optimizing energy recovery through velocity modulation, or any other such features, can be utilized in accordance with the above methodology, and the disclosure is not intended to be limited thereto.

It should be further appreciated by one of ordinary skill in the art that the interval of prediction or time horizon T can be selected to be any time period sufficient to contemplate vehicle operating conditions affecting control of vehicle, for example, including vehicle dynamics and vehicle control behaviors including braking and powertrain reaction times. Similarly, time horizon T can be modulated based upon factors affecting vehicle behavior, for example, including environmental factors affecting operation of the vehicle. In accordance with the above, time horizon T should be long enough to permit current vehicle velocity v to smoothly change to the future velocity $v_{future}$. Further, it will be appreciated that a longer time horizon, given a desired velocity, can prevent numerous iterative changes in vehicle velocity v for smoothing between numerous changes in vehicle velocity v by predicting vehicle response further into the future. However, it should also be appreciated that the time horizon T should be short enough to avoid unnecessary restrictions on vehicle velocity. For example, a vehicle velocity should not be restricted based upon approaching a lower speed limit upon the current roadway, the new limit still several miles distant. In the alternative, the time horizon T can be a relatively short value, based primarily on vehicle reaction times, and a secondary operation can be performed according to methods known in the art to preserve drivability between subsequent vehicle velocity changes by smoothing between iterative foreseeable changes as described above. Selection between a longer and shorter time horizon T can be calibrated based upon balancing a desire for fewer changes in the selected velocity of the vehicle and tolerance for a lower than necessary selected velocity. Additionally, the time horizon T can be feature based such that the time horizon varies based feature information, e.g., GPS data describing road conditions and geometry, monitoring of conditions such as traffic congestion, and driver selectable headway.

The above methods describe cruise control features that output both $v_{xxx}$ and $a_{xxx}$ terms. However, it will be appreciated that systems or features including only one or the other term ($v_{xxx}$ or $a_{xxx}$) can utilize or be incorporated into the above methods, for example, with the method implying preset or determinable limits to the missing term based upon the known term, other known variables, or calibration (for example, including a preset moderate acceleration limit or a velocity selected according to tracked vehicles proximate to the host vehicle). These terms filling-in for the missing term would then be utilized and compared to the requirements of the other cruise control features, as described above, and would only control if the fill-in terms were the minimum of the various features.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:
1. Method for controlling velocity of a vehicle according to requirements of a cruise control system including a plurality of cruise control features, the method comprising:
monitoring current desired velocity requirements of each of the plurality of cruise control features;
determining a current desired velocity to control the vehicle based upon the monitored current desired veloc- ity requirements comprising selecting a minimum of the current desired velocity requirements of the plurality of cruise control features;

predicting future desired velocity requirements of each of the plurality of cruise control features at a future time comprising selecting a minimum of the predicted future desired velocity requirements of each of the plurality of cruise control features at the desired time; and determining a current desired acceleration to control the vehicle to avoid exceeding the minimum of the predicted future desired velocity requirements while maintaining a current velocity of the vehicle below the minimum of the current desired velocity requirements of the plurality of cruise control features.

2. The method of claim 1, wherein the predicting future desired velocity requirements of the plurality of cruise control features at the future time comprises the future time comprising a time horizon.

3. The method of claim 2, wherein the time horizon is determined based upon vehicle operating conditions.

4. The method of claim 2, wherein the time horizon is determined based upon environmental factors.

5. The method of claim 2, wherein the determining the current desired acceleration to control the vehicle is based upon a difference of the minimum of the predicted future desired velocity requirements of the cruise control features and the current desired velocity to control the vehicle.

6. The method of claim 1, further comprising:
monitoring a current desired acceleration requirement for each of the cruise control features; and
wherein the current desired acceleration to control the vehicle does not exceed a minimum of the current desired acceleration requirements for the cruise control features.

7. The method of claim 1, wherein the plurality of cruise control features comprises a conventional cruise control feature, an adaptive cruise control feature, a speed limit following control system, and a curve speed control system.

8. The method of claim 1, wherein the plurality of cruise control features comprises a conventional cruise control feature and another cruise control feature selected from the group consisting of an adaptive cruise control feature, a speed limit following control system, and a curve speed control system.

9. Method for controlling velocity of a vehicle according to outputs of a multiple feature cruise control system, maintaining the velocity of the vehicle below a future desired velocity of each of the multiple features through a time horizon, the method comprising:
monitoring a current desired velocity of each of the cruise control features;
monitoring a current desired acceleration of each of the cruise control features;
determining a current desired velocity to control the vehicle based upon the current desired velocities of the cruise control features comprising selecting a minimum of the current desired velocities of the cruise control features;
predicting a future desired velocity for each of the cruise control features at the end of the time horizon based upon the monitored current desired velocity and current desired acceleration for each of the features comprising selecting a minimum of the predicted future desired velocities of the cruise control features;
determining a current desired acceleration to control the vehicle to avoid exceeding the minimum of the predicted future desired velocities while maintaining a current velocity of the vehicle below the minimum of the current desired velocities of the cruise control features based upon the current desired acceleration of the cruise control features.

10. The method of claim 9, wherein the current desired acceleration to control the vehicle comprises a vehicle acceleration command to a powertrain control device.

11. The method of claim 10, wherein the current desired acceleration to control the vehicle further comprises a vehicle acceleration command to a braking system.

12. Apparatus for controlling velocity of a vehicle according to requirements of a cruise control system including a plurality of cruise control features, the apparatus comprising:
a powertrain control device controlling an output of a powertrain of the vehicle;
a control module:
monitoring current desired velocity requirements of each of the plurality of cruise control features;
determining a current desired velocity to control the vehicle based upon the monitored current desired velocity requirements comprising selecting a minimum of the current desired velocity requirements of the plurality of cruise control features;
predicting future desired velocity requirements of each of the plurality of cruise control features at a time comprising selecting a minimum of the predicted future desired velocity requirements of each of the plurality of cruise control features at the desired time; and
determining a current desired acceleration to control the vehicle to avoid exceeding the minimum of the predicted future desired velocity requirements while maintaining a current velocity of the vehicle below the minimum of the current desired velocity requirements of the plurality of cruise control features.

13. The apparatus of claim 12, wherein the plurality of cruise control features comprises a conventional cruise control feature; and
the apparatus further comprising a human interface device monitoring a driver-selected reference velocity.

14. The apparatus of claim 12, wherein the plurality of cruise control features comprises an adaptive cruise control feature; and
the apparatus further comprising a forward looking sensor generating information about a target vehicle in front of the vehicle.

15. The apparatus of claim 12, wherein the plurality of cruise control features comprises a speed limit following control feature; and
the apparatus further comprising a device generating information about a speed limit of a current roadway.

16. The apparatus of claim 12, wherein the plurality of cruise control features comprises a curve speed control feature; and
the apparatus further comprising a forward looking sensor generating information about a curvature and a suggested speed of a current roadway.

17. The apparatus of claim 12, the control module further:
monitoring a current desired acceleration requirement for each of the cruise control features; and
wherein the current desired acceleration to control the vehicle does not exceed a minimum of the current desired acceleration requirements for the cruise control features.

* * * * *